(12) United States Patent
Hayashi et al.

(10) Patent No.: US 12,440,889 B2
(45) Date of Patent: Oct. 14, 2025

(54) CORE QUALITY ESTIMATION SYSTEM, CORE QUALITY ESTIMATION METHOD, NON-TRANSITORY STORAGE MEDIUM

(71) Applicant: TOYOTA JIDOSHA KABUSHIKI KAISHA, Toyota (JP)

(72) Inventors: Motoki Hayashi, Okazaki (JP); Hiroyuki Ikuta, Nisshin (JP); Naoya Takahashi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 503 days.

(21) Appl. No.: 17/960,933

(22) Filed: Oct. 6, 2022

(65) Prior Publication Data

US 2023/0191474 A1 Jun. 22, 2023

(30) Foreign Application Priority Data

Dec. 21, 2021 (JP) ................. 2021-207372

(51) Int. Cl.
*B22C 9/10* (2006.01)
*B22C 19/04* (2006.01)
*G05B 13/02* (2006.01)

(52) U.S. Cl.
CPC ............. *B22C 9/10* (2013.01); *B22C 19/04* (2013.01); *G05B 13/0265* (2013.01)

(58) Field of Classification Search
CPC ............. B22C 19/04; B22C 9/10; B22C 9/12
See application file for complete search history.

(56) References Cited

U.S. PATENT DOCUMENTS

2014/0358382 A1  12/2014  Kou et al.
2022/0062974 A1  3/2022  Noguchi

FOREIGN PATENT DOCUMENTS

| JP | H10-225746 A | 8/1998 | |
|---|---|---|---|
| JP | 2011-206788 A | 10/2011 | |
| JP | 2013-196051 A | 9/2013 | |
| JP | 2020-110811 A | 7/2020 | |
| JP | 2021-159920 A | 10/2021 | |
| WO | 2006/104149 A1 | 10/2006 | |
| WO | WO-2014132269 A2 * | 9/2014 | ............. B22C 19/04 |

* cited by examiner

*Primary Examiner* — Kevin E Yoon
(74) *Attorney, Agent, or Firm* — Oliff PLC

(57) ABSTRACT

A core quality estimation system that estimates quality of a core to be formed by filling a mold with kneaded sand produced by kneading in a kneading tank and heating the kneaded sand includes a computer that executes operations of acquiring mold temperature information of the mold, acquiring environmental information regarding a surrounding environment in which the core is formed, and estimating the quality of the core based on the mold temperature information and the environmental information.

5 Claims, 10 Drawing Sheets

CORE QUALITY ESTIMATION SYSTEM, CORE QUALITY ESTIMATION METHOD, NON-TRANSITORY STORAGE MEDIUM

CROSS-REFERENCE TO RELATED APPLICATION

This application claims priority to Japanese Patent Application No. 2021-207372 filed on Dec. 21, 2021, incorporated herein by reference in its entirety.

BACKGROUND

1. Technical Field

The disclosure relates to a core quality estimation system, a core quality estimation method, a non-transitory storage medium, a trained model, and a machine learning device.

2. Description of Related Art

In general, in a core forming device that forms a core for casting, the core is formed by filling a mold with kneaded sand produced by kneading core sand, water glass, water, a surfactant, and the like, which are the raw materials of the core, and heating the kneaded sand.

Japanese Unexamined Patent Application Publication No. 2020-110811 (JP 2020-110811 A) discloses a technology of reporting a possibility of quality deterioration of a core in such a core forming device by measuring a temperature of a mold when the mold is filled with kneaded sand, and giving notification of abnormality when a difference between the measured temperature and a firing temperature, which is an appropriate temperature for forming the core, is equal to or greater than a predetermined value.

SUMMARY

Here, the inventors have found the following problems in the quality control of the core forming device. In the core forming device, core sand, water glass, water, a surfactant, and the like are kneaded at the optimum ratio calculated in advance; however, the water evaporates at the time of kneading, and thus the amount of water contained in the kneaded sand when it actually fills the mold is affected by, for example, the surrounding environment such as temperature and humidity. Further, the kinematic viscosity of the kneaded sand changes depending on the amount of water contained in the kneaded sand, and as a result, a behavior of the kneaded sand when the mold is filled with the kneaded sand is affected by the surrounding environment.

However, in the quality control of the core forming device described in JP 2020-110811 A, the effect of the surrounding environment is not taken into consideration, and there is room for improvement in the quality control of the core forming device.

The disclosure provides a core quality estimation system, a core quality estimation method, a non-transitory storage medium, and a trained model capable of estimating core quality more precisely, and a machine learning device capable of learning core quality.

A first aspect of the disclosure relates to a core quality estimation system. The core quality estimation system estimates quality of a core to be formed by filling a mold with kneaded sand produced by kneading in a kneading tank and heating the kneaded sand. The core quality estimation system includes a computer that executes operations of acquiring mold temperature information of the mold, acquiring environmental information regarding a surrounding environment in which the core is formed, and estimating the quality of the core based on the mold temperature information and the environmental information.

With the configuration, the quality of the core to be formed is estimated after considering the environmental information regarding the surrounding environment in which the core is formed, and thus it is possible to estimate the quality of the core more precisely based on the change in the amount of water contained in the kneaded sand.

In the core quality estimation system according to the first aspect, the environmental information may include at least one of humidity information and atmospheric pressure information for the surrounding environment. With the configuration, at least one of the humidity information and the atmospheric pressure information is considered, and thus, it is possible to estimate the quality of the core more precisely based on the change in the amount of water contained in the kneaded sand.

In the core quality estimation system according to the first aspect, the computer may acquire the environmental information based on position information for forming the core. With the configuration, the environmental information is acquired based on the position information, and thus a sensor or the like for acquiring the environmental information does not have to be provided, which can lead to cost reduction.

In the core quality estimation system according to the first aspect, the computer may estimate the quality of the core to be formed by the kneaded sand before the filling of the mold with the kneaded sand is completed. With the configuration, the estimation is performed before the filling with the kneaded sand is completed and accordingly, the mold temperature of the mold is controlled based on the estimation result, thereby making it possible to suppress occurrence of defects in the core.

In the core quality estimation system according to the first aspect, the computer may estimate the quality of the core to be formed by the kneaded sand before kneading for the kneaded sand in the kneading tank is completed. With the configuration, the estimation is performed before the kneading for the kneaded sand in the kneading tank is completed, and accordingly, the amount of water input at the time of kneading in the kneading tank is controlled, thereby making it possible to suppress occurrence of defects in the core.

In the core quality estimation system according to the first aspect, the computer may estimate the quality of the core by using a behavior analysis of the kneaded sand in the mold using computer aided engineering (CAE). With the configuration, the behavior of the kneaded sand in the mold is analyzed by using CAE, and thus it is possible to estimate the quality of the core based on the behavior in the mold.

In the core quality estimation system according to the first aspect, the computer may estimate the quality of the core based on mold temperature information of the mold at a time of filling with or heating of the kneaded sand, the mold temperature information being obtained by using the behavior analysis. With the configuration, the quality of the core is estimated from the behavior analysis of the kneaded sand in the mold based on the mold temperature information of the mold, and thus it is possible to estimate the quality of the core affected by the mold temperature.

In the core quality estimation system according to the first aspect, the computer may estimate the quality of the core based on behavior information at a time of filling with the kneaded sand, the behavior information being obtained by using the behavior analysis. With the configuration, the quality of the core is estimated from the behavior analysis of the kneaded sand in the mold based on the behavior information sand at the time of filling with the kneaded sand, and thus it is possible to estimate the quality of the core affected by the behavior of the kneaded sand.

In the core quality estimation system according to the first aspect, the computer may estimate the quality of the core based on the mold temperature information and the environmental information by using a trained model that is trained by machine learning using supervised data with the mold temperature information and the environmental information as inputs and quality information regarding the quality of the core as an output. With the configuration, the quality of the core to be formed is estimated by using the trained model that has been trained in advance in the relationship between the mold temperature information and environmental information and the quality information for the core, and thus it is possible to estimate the quality of the core more precisely based on the change in the amount of water contained in the kneaded sand.

In the core quality estimation system according to the first aspect, the computer may further execute operations of accepting a correction to the estimation result, and updating the trained model based on contents after correction when the correction is accepted. With the configuration, it is possible to suitably re-train the trained model, and to estimate the quality of the core more precisely.

In the core quality estimation system according to the first aspect, the computer may further execute an operation of controlling a forming condition for forming the core based on the estimation result. With the configuration, the forming condition is controlled based on the estimation result, and thus it is possible to suppress occurrence of defects in the core.

In the core quality estimation system according to the first aspect, the computer may control at least one of a mold temperature of the mold and an amount of water input at a time of kneading in the kneading tank. With the configuration, the mold temperature and the amount of water input are adjusted, and thus it is possible to suppress occurrence of defects in the core.

A second aspect of the disclosure relates to a core quality estimation method. The core quality estimation method is executed by a computer adapted to estimate quality of a core to be formed by filling a mold with kneaded sand produced by kneading in a kneading tank and heating the kneaded sand. The core quality estimation method includes acquiring mold temperature information of the mold, acquiring environmental information regarding a surrounding environment in which the core is formed, and estimating the quality of the core based on the mold temperature information and the environmental information.

A third aspect of the disclosure relates to a non-transitory storage medium storing instructions that are executable by one or more computers and that cause the one or more computers to perform functions. The instructions are adapted to estimate quality of a core to be formed by filling a mold with kneaded sand produced by kneading in a kneading tank and heating the kneaded sand. The functions include acquiring mold temperature information of the mold, acquiring environmental information regarding a surrounding environment in which the core is formed, and estimating the quality of the core based on the mold temperature information and the environmental information.

A fourth aspect of the disclosure relates to a trained model. The trained model is provided to cause a computer to function to output quality information regarding quality of a core based on mold temperature information for a mold filled with kneaded sand and environmental information regarding a surrounding environment in which the core is formed. The trained model is trained by machine learning using supervised data with the mold temperature information and the environmental information as inputs and the quality information as an output.

With the configuration, the quality of the core to be formed is estimated after considering the environmental information regarding the surrounding environment in which the core is formed, and thus it is possible to estimate the quality of the core more precisely based on the change in the amount of water contained in the kneaded sand.

A fifth aspect of the disclosure relates to a machine learning device. The machine learning device learns quality of a core to be formed by filling a mold with kneaded sand produced by kneading in a kneading tank and heating the kneaded sand. The machine learning device includes a computer that executes operations of acquiring mold temperature information of the mold, acquiring environmental information regarding a surrounding environment in which the core is formed, acquiring quality information regarding the quality of the core, and learning quality of a formed core by using supervised data with the mold temperature information and the environmental information as inputs and the quality information as an output.

With the configuration, it is possible to generate the trained model capable of estimating the quality of the core to be formed after learning the quality of the core to be formed and considering the environmental information regarding the surrounding environment.

According to the aspects of the disclosure, it is possible to provide a core quality estimation system, a core quality estimation method, a non-transitory storage medium, and a trained model capable of estimating core quality more precisely, and a machine learning device capable of learning core quality.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, specific embodiments of the disclosure will be described in detail with reference to the drawings. Note that, the embodiments of the disclosure are not limited to the following embodiments. Further, in order to clarify the explanation, the following description and drawings are appropriately simplified.

Figure 1:
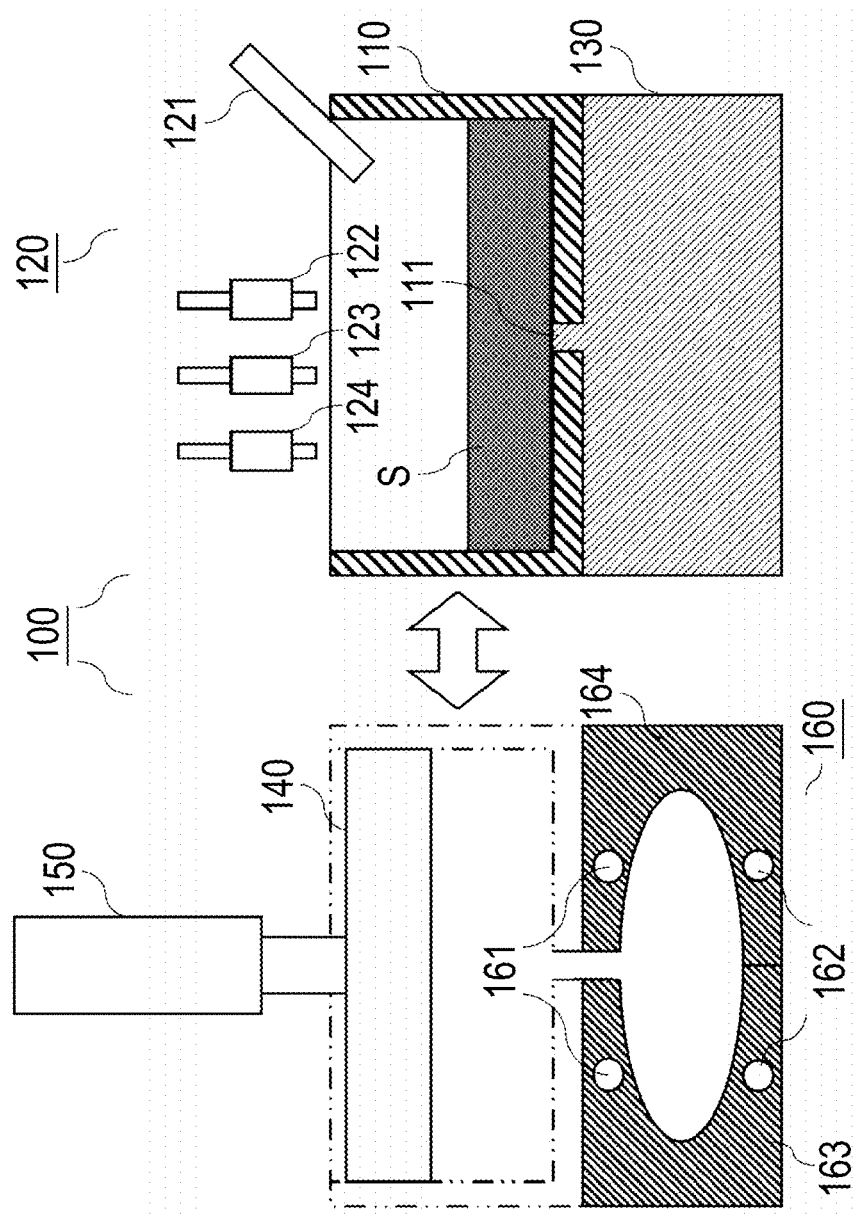
FIG. 1 is an overall sectional view schematically showing a core forming device at the time of kneading for kneaded sand.
Figure 2:
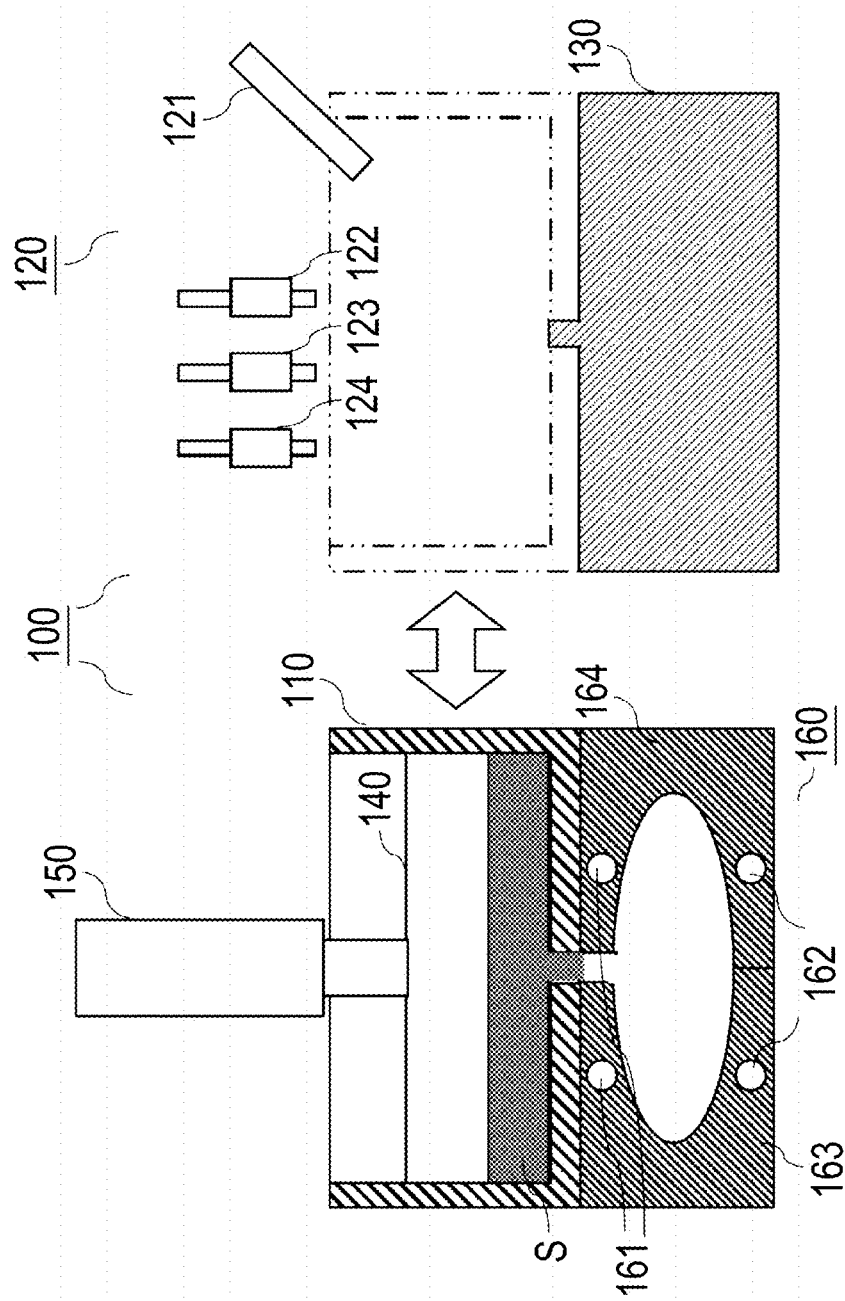
FIG. 2 is an overall sectional view schematically showing the core forming device at the time of filling with kneaded sand.

First, before describing a core quality estimation system according to the embodiments of the disclosure, a core forming device for forming a core for which a quality is estimated by the core quality estimation system will be briefly described. FIGS. 1 and 2 are overall sectional views schematically showing a core forming device.

As shown in FIGS. 1 and 2, a core forming device 100 includes a kneading tank 110, means 120 for supply raw materials, a pedestal 130, a piston 140, a cylinder 150, and a mold 160.

The kneading tank 110 is a storage tank for producing kneaded sand by kneading raw materials. The kneading tank 110 is, for example, a cylindrical bottomed container having an open top and a bottom. The kneading tank 110 has dimensions of approximately, an inner diameter of 150 to 350 mm and a height of 150 to 350 mm, and for example, has dimensions of approximately, an inner diameter of 250 mm and a height of 250 mm. Liquid additives such as core sand, water glass, water, and surfactant, which are raw materials for cores, are supplied to the kneading tank 110 from an open upper portion thereon by the means 120 for supplying raw materials (means 121 for supplying core sand, means 122 for supplying water glass, means 123 for supplying water, and means 124 for supplying surfactant). Here, the water glass acts as a binder. The binder is not limited to water glass, and inorganic substances such as clays and cement can be used.

At the bottom of the kneading tank 110, a through-hole 111 for ejecting a kneaded material S produced by kneading the raw materials with a kneading blade (not shown) is provided inside the kneading tank 110. Further, the through-hole 111 is provided with, for example, a rubber-like valve or the like with a notch, and with the configuration, the leakage of the kneaded material S from the kneading tank 110 is suppressed and opening at the time of ejection is performed.

The pedestal 130 is a member for supporting the kneading tank 110. A convex portion for fitting with the through-hole 111 provided at the bottom of the kneading tank 110 is formed on a upper surface of the pedestal 130, and holds the valve provided in the through-hole 111 by supporting the valve from below.

In this way, in the kneading tank 110 placed on the pedestal 130, the raw materials are kneaded, and then the kneading tank 110 accommodating the kneaded material S is transferred from the pedestal 130 onto on the mold 160. The transfer can be executed by, for example, a transport device having means for driving such as a motor, means for holding the kneading tank 110, and the like. FIG. 1 shows a state in which the kneading tank 110 is placed on the pedestal 130, and the kneading tank 110 on the mold 160 is shown by a two-dot chain line. FIG. 2 shows a state in which the kneading tank 110 is placed on the mold 160 after being transferred, and the kneading tank 110 on the pedestal 130 is shown by a two-dot chain line.

As shown in FIG. 2, after the kneading tank 110 is placed on the mold 160, the kneaded material S in the kneading tank 110 is ejected into the mold 160 by the piston 140 to fill the mold 160. Here, the piston 140 can be moved in a vertical direction by the cylinder 150. When the cylinder 150 is lowered by a controller (not shown), the piston 140 is lowered, and the kneaded material S is ejected into the mold 160 to fill the mold 160.

The kneaded material S filling the mold 160 is heated by the mold 160 that has a temperature adjusted by a mold heat controller 161 inside the mold 160 and is cured along an inner wall of the mold 160 to form a core having a mold shape. The mold heat controller 161 heats each part of the mold 160 and lowers and maintains the temperature of the part, and may be provided inside the mold 160 or may be provided outside. Specifically, the mold heat controller 161 can adjust the mold temperature with a heater, a coolant circulator, or the like. Further, the mold 160 is provided with a temperature sensor 162, and continuously or discontinuously measures the mold temperature of the mold 160. The temperature sensor 162 may be, for example, a contact temperature sensor such as a thermocouple, or a non-contact temperature sensor. The location, number, or the like, of the temperature sensor 162 to be installed are appropriately decided from the shape of the mold 160 and the like.

The formed core is taken out from the mold 160. For example, the core can be taken out from the mold 160 by separating a left mold 163 from a right mold 164 in a configuration in which the left mold 163 is relatively movable with respect to the right mold 164.

Here, an example of the core forming device for forming a core to be estimated in quality by the core quality estimation system according to the embodiment of the disclosure has been described; however, the configuration and the forming procedure may be changed in various ways, and in the core quality estimation system according to the embodiment of the disclosure, the core forming device for forming a core to be estimated is not limited to the configuration of the core forming device described above.

First Embodiment

Figure 3:
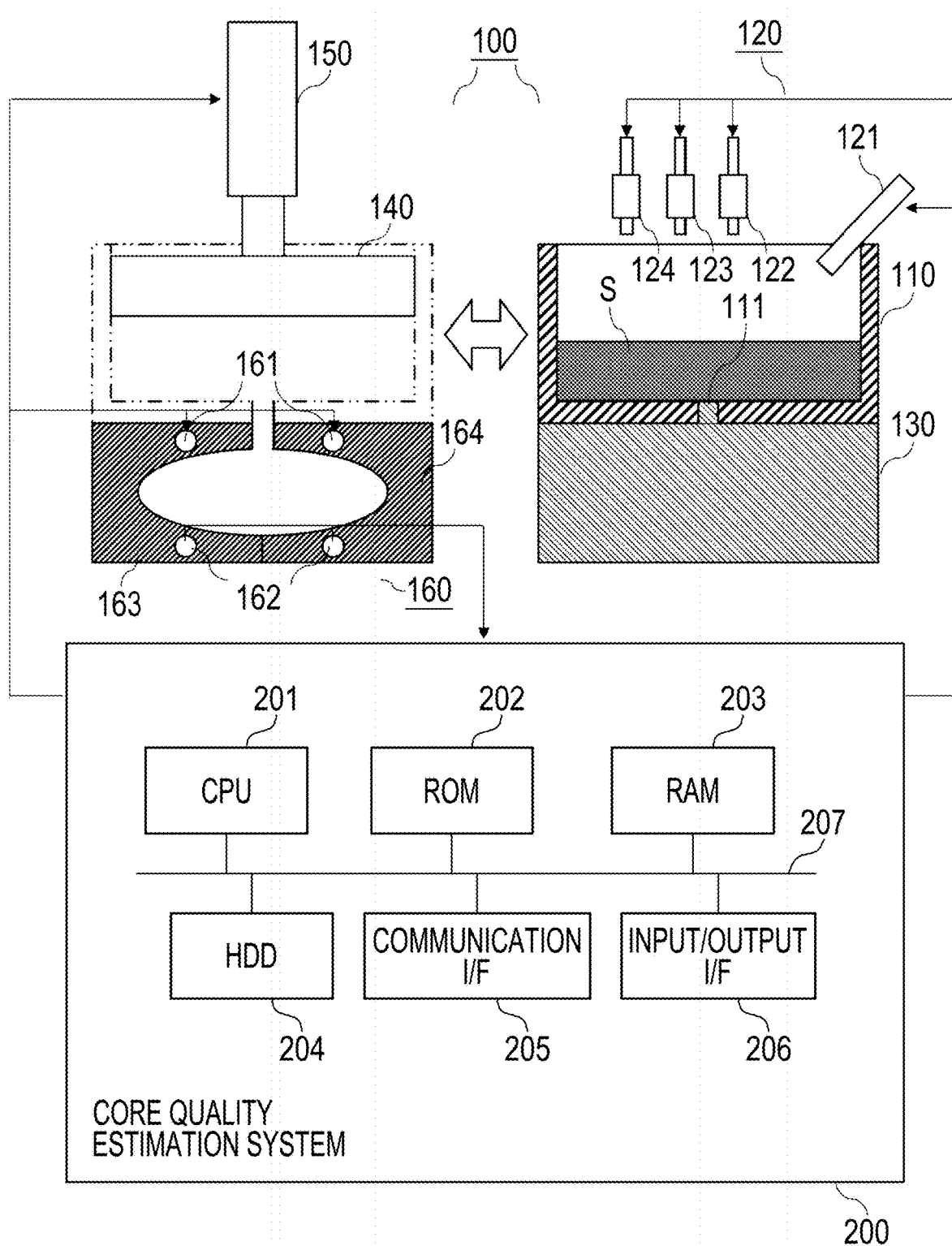
FIG. 3 is a view schematically showing a hardware configuration of a core quality estimation system according to a first embodiment.

Next, a core quality estimation system according to a first embodiment will be described. FIG. 3 is a block diagram schematically showing a hardware configuration of a core quality estimation system 200 according to the present embodiment.

As shown in FIG. 3, the core quality estimation system 200 has computer resources of a general information processing device such as a personal computer. Specifically, the core quality estimation system 200 includes a central processing unit (CPU) 201, a read only memory (ROM) 202, a random access memory (RAM) 203, a hard disk drive (HDD) 204, a communication interface (I/F) 205, and an input/output interface (I/F) 206. Further, each of the parts is connected to the others to be able to communicate with the others through a data bus 207.

Here, an example will be described in which each part of the core quality estimation system 200 is implemented by an information processing device incorporating control functions of the core forming device 100; however, each part of the core quality estimation system 200 may be implemented by an information processing device provided independently of a control device having the control functions of the core forming device 100, and some or all functions may be performed in an external device such as an edge or a server (cloud). Specifically, the functions may be performed in an in-factory server that has a function as a platform that aggregates information about each facility in a factory and manages and analyzes data, and an inter-factory server that manages facilities across a plurality of factories.

The CPU 201 is a microprocessor that comprehensively controls the core quality estimation system 200. Specifically, the CPU 201 reads various control programs stored in the ROM 202 and the HDD 204 to be executed in the present embodiment, and execute the programs expanded on the RAM 203. Here, as a storage device, a solid state drive (SSD) may be provided in place of or in addition to the HDD 204.

The communication interface 205 performs communication between the core quality estimation system 200 and an external device. Here, communication is implemented by various communication technologies regardless of whether the communication is a wireless or wired communication. In the present embodiment, for example, the mold temperature information of the mold 160 is received from the temperature sensor 162 provided in the core forming device 100.

The input/output interface 206 performs input/output between the core quality estimation system 200 and the outside. For example, the input/output interface 206 is provided with an output device such as a display that displays information on the estimated core quality, and an input device for use by an operator.

Figure 4:
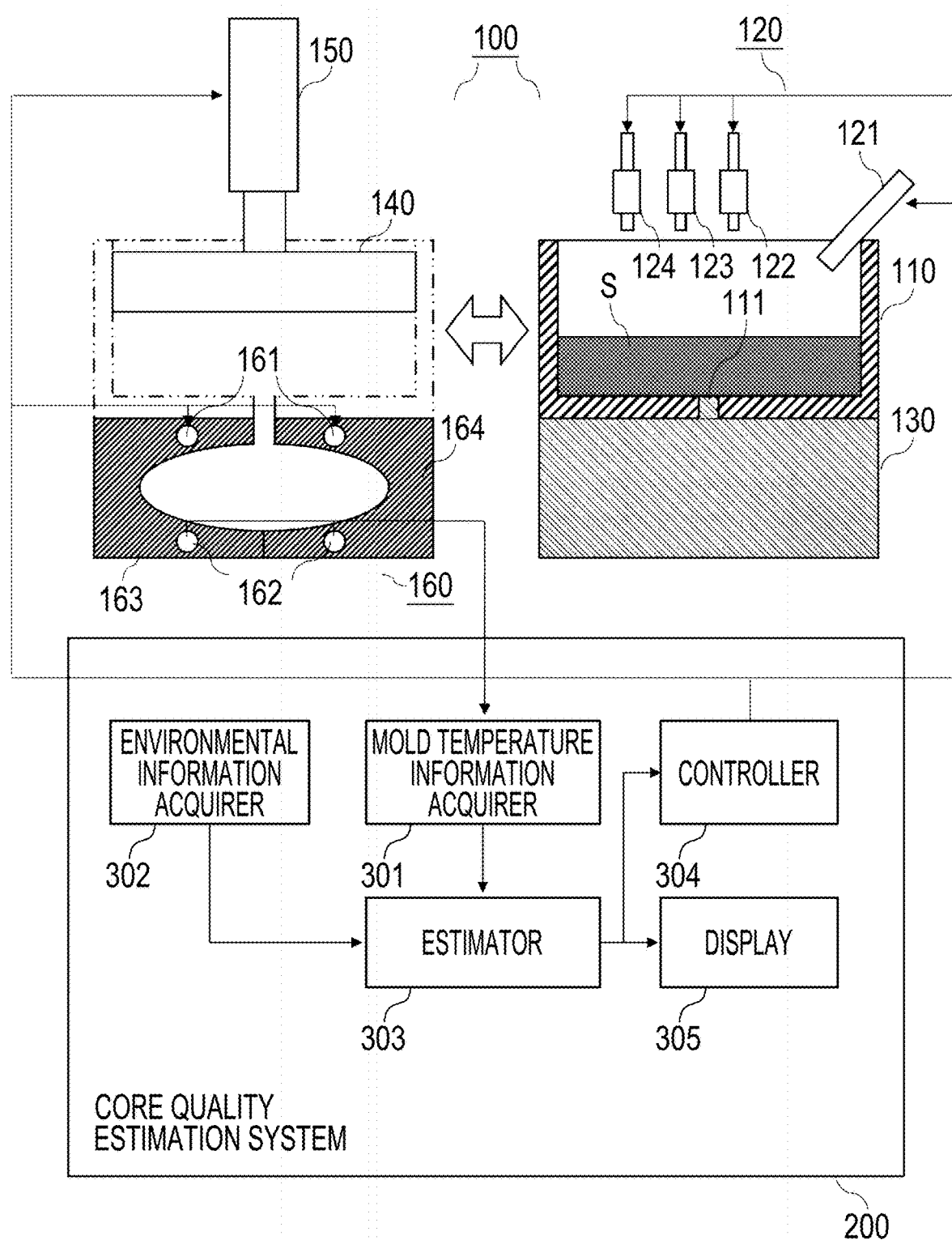
FIG. 4 is a view showing a functional configuration of the core quality estimation system according to the first embodiment.

Next, a functional configuration of the core quality estimation system 200 according to the present embodiment will be described. FIG. 4 is a block diagram showing the functional configuration of the core quality estimation system 200 according to the present embodiment.

As shown in FIG. 4, the core quality estimation system 200 includes a mold temperature information acquirer 301, an environmental information acquirer 302, an estimator 303, a controller 304, and a display 305, as functional configurations. The elements function by the CPU 201 executing various control programs stored in the ROM 202 or the like. Further, some or all the functions of the core quality estimation system 200 may be implemented by a hardware circuit.

The mold temperature information acquirer 301 acquires mold temperature information of the mold 160 filled with the kneaded sand S. Specifically, the mold temperature information is acquired from the temperature sensor 162 provided in the mold 160 and measuring the mold temperature. Further, in the case where the mold 160 is provided with, for example, a plurality of the temperature sensors 162, information containing mold temperatures and position information for the temperature sensors 162 in the mold 160 associated with the mold temperatures may be acquired as the mold temperature information. Here, information obtained by acquiring just the mold temperatures from the temperature sensors 162 and associating the mold temperatures with the position information in the mold temperature information acquirer 301 may be acquired as the mold temperature information.

The environmental information acquirer 302 acquires environmental information regarding a surrounding environment in which the core is formed. Specifically, environmental information such as temperature, humidity, and atmospheric pressure can be acquired by using weather information or weather forecast information corresponding to position information for a position where the core forming device 100 is used, which provided from the outside based on the position information. For example, when the environmental information acquirer 302 acquires position information in which the core forming device 100 is installed, the environmental information acquirer 302 transmits the position information together with a weather information request to a weather information providing server connected through a communication network such as the Internet. The weather information providing server reads the weather information for the position specified by the received position information from the database and transmits the weather information to the environmental information acquirer 302. In this way, the environmental information acquirer 302 can acquire weather information and the like corresponding to the position information.

Here, as for the position information, the core forming device 100 and the core quality estimation system 200 may be provided with a function of acquiring position information such as a GPS function and the position information may be acquired by the GPS function, or the position information input by a user or the like who uses the core quality estimation system 200 may be used. By acquiring the environmental information based on the position information in this way, a sensor or the like for acquiring the environmental information does not have to be provided, which can lead to cost reduction. Of course, a configuration may be used in which the environmental information is obtained by wired or wireless communication means from a sensor provided around the core forming device 100 and measuring environmental information such as air temperature, humidity, and atmospheric pressure.

The estimator 303 estimates the quality of the core to be formed based on the mold temperature information acquired by the mold temperature information acquirer 301 and the environmental information acquired by the environmental information acquirer 302. The estimator 303 estimates that the core has a higher quality than a predetermined reference value (that is, a good product), or that the core has a lower quality than the reference value (that is, a defective product) for example, through a comparison with the reference value. At this time, the reference value does not have to be one, and may be multiple. Further, the degree of quality may be expressed by a numerical value or a rank, or information indicating a specific content of quality may be generated.

Specifically, the quality of the core is estimated by using the behavior analysis of the kneaded sand S in the mold 160 using computer aided engineering (CAE). By using the analysis using CAE, for example, it is possible to estimate the quality, which is difficult to estimate by a calculation formula. Software used for the analysis may be appropriately selected from various commercially available analysis software and commercially available analysis software modified or improved for the analysis.

First, an analysis target is a behavior of the kneaded material S that fills the mold 160 from the kneading tank 110 by the piston 140 within the mold 160 (including a gate portion which is an entrance of the mold 160), and an analysis model is constructed using drawing data (CAD data) of the parts of the target. The constructed analysis model is stored in the estimator 303, the behavior of the kneaded sand S in the mold 160 is analyzed by inputting analysis conditions to the analysis model, and an analysis result is output. As for the analysis result, various output forms can be selected by various software.

Here, the behavior of the kneaded material S in the mold 160 is affected by the amount of water contained in the kneaded sand S, the kinematic viscosity, and the like. Further, although the kneaded sand S is produced by kneading core sand, water glass, water, surfactant and the like, the water evaporates at the time of kneading, and thus, when the kneaded sand S actually fills the mold, the amount of water contained in the kneaded sand S and the kinematic viscosity of the kneaded sand S are affected by environmental information about the surroundings. In the present embodiment, since at least the mold temperature information and the environmental information are input as the analysis conditions to perform the behavior analysis, the behavior analysis can be performed precisely in consideration of the effect. Here, as the environmental information, any one of temperature information, humidity information, and atmospheric pressure information may be used, and for example, two or more pieces of information may be used in combination, such as temperature information and humidity information, humidity information and atmospheric pressure information, and temperature information and atmospheric pressure information. With such a configuration, the effect on the amount of water contained in the kneaded sand S and the kinematic viscosity thereof can be considered in detail, and the behavior analysis can be performed more precisely.

Further, in the present embodiment, the behavior analysis is performed with information on the forming conditions such as the raw material type of the kneaded sand S, the raw material ratio such as the amount of water added at the time of kneading, the kinematic viscosity of the kneaded sand S, and the ejection pressure by the piston 140 as conditions that have been set or stored in the estimator 303 in advance, which are certain analysis conditions other than the mold temperature information and the environmental information; however, the behavior analysis can also be performed by inputting the information thereon at the time of the analysis. In this case, the core quality estimation system 200 further having a function of acquiring forming conditions such as the raw material type of the kneaded sand S, the raw material ratio such as the amount of water, the kinematic viscosity of the kneaded sand S, and the ejection pressure can perform the behavior analysis by inputting the information on the forming conditions at the time of the analysis.

In this way, the quality of the core to be formed is estimated based on the information obtained by using the behavior analysis of the kneaded sand S using CAE. Specifically, the quality of the core is estimated based on the mold temperature information of the mold 160 at the time of filling with and heating of the kneaded sand S. That is, the mold temperature of the portion that comes into contact with the kneaded sand S at the time of filling or heating greatly affects the quality of the core to be formed, and thus when the mold temperature deviates from a predetermined temperature range, defects occur. For example, when the mold temperature is higher than a specified range, defects such as breakage and cracking of the core occur. On the other hand, when the mold temperature is lower than the specified range, defects such as sticking of the core to the mold 160 occur. Further, in the present embodiment, since the quality of the core is estimated based on the mold temperature information obtained by using the behavior analysis, the mold temperature at the time of filling can be estimated from before the mold 160 is actually filled with the kneaded sand S and more detailed temperature distribution information can be estimated than the temperature sensor 162, thereby making it possible to precisely estimate the quality of the core.

Further, the estimator 303 can also estimate the quality of the core based on the behavior information for the kneaded sand S at the time of filling, where the behavior information is obtained by using the behavior analysis of the kneaded sand S. Specifically, the estimator 303 estimates the quality of the core based on flow rate information and energy information for the kneaded sand S in the mold 160. That is, since the behavior information for the kneaded sand S in the mold 160 greatly affects the quality of the core to be formed, when the flow rate, energy, or the like deviates from a predetermined specified range, defects occur. For example, when the kinematic viscosity of the kneaded sand S is high and the flow rate is slow, defects such as sand clogging and wrinkles occur in the core to be formed. On the other hand, when the kinematic viscosity of the kneaded sand S is low and the flow rate is high, defects such as poor deformation by sticking to the mold 160 occur in the core to be formed. Therefore, the estimator 303 can estimate the quality of the core based on the pieces of information. The above-mentioned specified values of the mold temperature, the flow rate, and the energy can be set by checking whether or not the quality is good with an experiment or the like in advance.

The controller 304 controls the forming conditions for forming the core based on an estimation result by the estimator 303. Specifically, when the estimator 303 estimates that a defect occurs in the core to be formed, the controller 304 performs control to adjust the mold temperature of the mold 160 and the amount of water input at the time of kneading in the kneading tank 110, thereby suppressing occurrence of defects in the core to be formed. For example, when the estimator 303 estimates that the mold temperature of the mold 160 at the time of filling with the kneaded sand S is out of the specified range, the controller 304 controls the temperature by controlling the mold heat controller 161 such that the mold temperature is within the specified range. When the flow rate is estimated to be slower than the specified range, the controller 304 performs control such that the flow rate is within the specified range, by controlling the means 123 for supplying water to adjust the amount of water input at the time of kneading in the kneading tank 110. The control of the forming conditions described here is merely exemplary, and similarly, the amount of water contained in the kneaded sand S may be adjusted by controlling the means 121 for supplying core sand, the means 122 for supplying water glass, the means 124 for supplying surfactant, or the like, or by adjusting the kneading time, the ejection pressure by the piston 140 may be adjusted by controlling the operation of the cylinder 150, and occurrence of defects in the core can be suppressed by controlling various other forming conditions. Here, the controller 304 does not have to be provided in the core quality estimation system 200, and for example, the operator may operate a separately provided control device based on the estimation result by the estimator 303 to suppress occurrence of defects in the core.

The display 305 displays the estimation result of the quality of the core estimated by the estimator 303, the construction conditions for suppressing the defect decided by the controller 304, and the like. The display 305 can notify the operator of information or warnings regarding occurrence of quality defects in the core by displaying the information, and for example, the operator can adjust the forming conditions of the core and cancel the forming. Further, although an example has been described here in which the core quality estimation system 200 includes the display 305 as an information processing device, the core forming device 100 may be provided with the display 305, and the tablet terminal or the like owned by the operator may be provided with the display 305.

Figure 5:
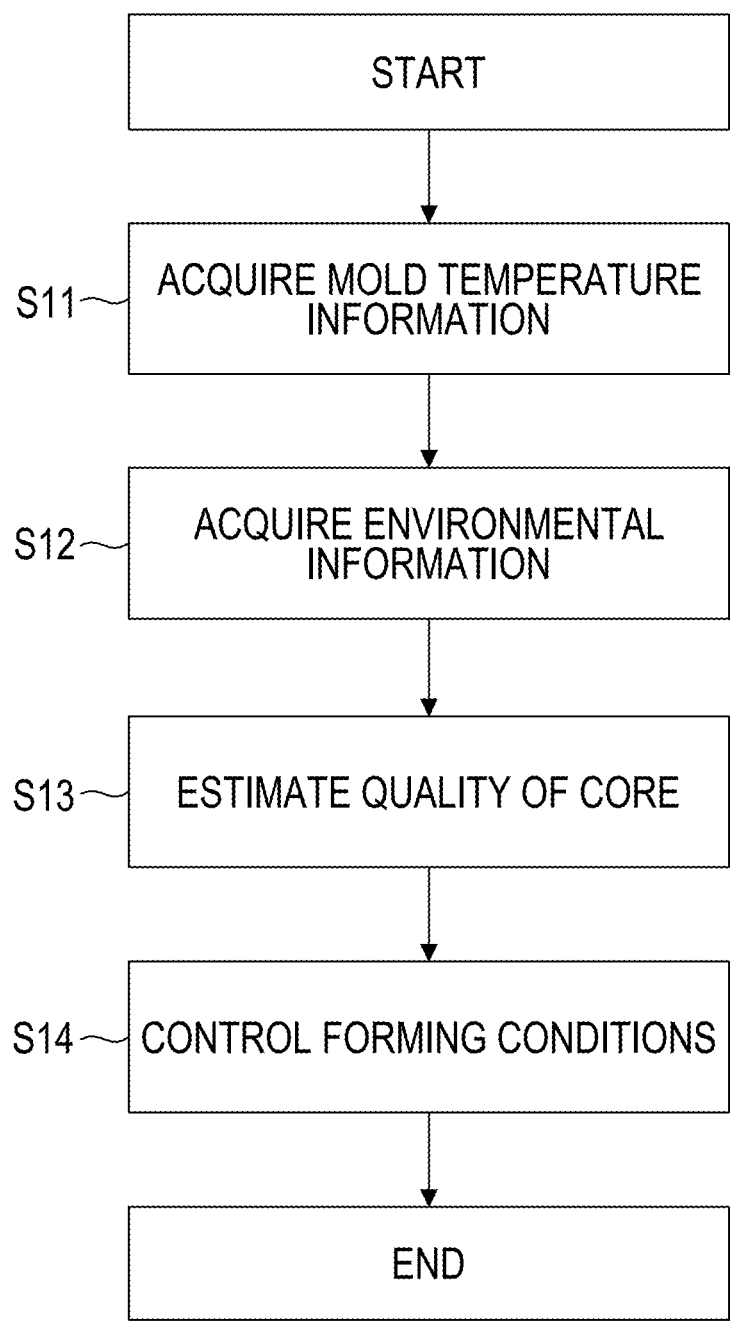
FIG. 5 is a flowchart of a core quality estimation process according to the first embodiment.

Next, an estimation procedure of an estimation process in the core quality estimation system 200 according to the present embodiment, that is, a core quality estimation method will be described. FIG. 5 is a flowchart of a core quality estimation process according to the present embodiment. The procedure is not limited to the flowchart; for example, in the core forming device 100, the process starts at the timing when kneading for the kneaded sand S is performed in the kneading tank 110 every time the core forming process is performed.

First, in step S11, the mold temperature information acquirer 301 acquires the mold temperature information of the mold 160 filled with the kneaded sand S. Next, in step S12, the environmental information acquirer 302 acquires environmental information regarding a surrounding environment in which the core is formed. The environmental information acquirer 302 may acquire the environmental information every time the estimation process is performed, but may acquire the environmental information at regular intervals and use the same value for a plurality of estimation processes. Further, the order of steps S11 and S12 may be changed as appropriate.

Next, in step S13, the estimator 303 estimates the quality of the core to be formed based on the mold temperature information acquired by the mold temperature information acquirer 301 and the environmental information acquired by the environmental information acquirer 302. Here, it is desirable that the estimation by the estimator 303 is performed before the filling of the mold 160 with the kneaded sand S is completed in the forming process of the core to be estimated. By performing the estimation before the filling with the kneaded sand S is completed, the mold temperature of the mold 160 is controlled based on the estimation result, thereby making it possible to suppress occurrence of defects in the core. Further, it is more desirable that the estimation by the estimator 303 is performed before the kneading for the kneaded sand S in the kneading tank 110 is completed in the forming process of the core to be estimated. By performing the estimation before the kneading for the kneaded sand S in the kneading tank 110 is completed, the amount of water input at the time of kneading in the kneading tank 110 is controlled, and thus it is possible to suppress occurrence of defects in the core. When it is desired to estimate the quality of the core earlier than a predetermined timing of the core forming process in this way, the estimation can be performed by some actions, such as adjusting the timing of starting the procedure to an analysis time, and degenerating the analysis software used for the above-mentioned behavior analysis.

Subsequently, in step S14, the controller 304 controls the forming conditions for forming the core based on the estimation result by the estimator 303, and the procedure ends. Although omitted in the procedure, displaying the estimation result of the quality of the core estimated by the estimator 303, or the construction conditions for suppressing defects, which are decided by the controller 304, and the like on the display 305 may be added. Further, although an example has been described here in which the estimation process is performed every time the core forming process is performed in the core forming device 100, the estimation process may be performed once among a plurality of core forming processes, and may be performed in a virtual environment independent of the core forming process. That is, it is possible to appropriately decide the timing for starting the process, and the timing for estimation by the estimator 303. For example, the configuration may be such that in the next forming process, the forming conditions are controlled by using the estimation result in the current forming process.

As described above, the core quality estimation system according to the present embodiment includes the mold temperature information acquirer 301 that acquires mold temperature information of the mold, the environmental information acquirer 302 that acquires environmental information regarding the surrounding environment in which the core is formed, and the estimator 303 that estimates the quality of the core based on the mold temperature information and environmental information, and accordingly, the quality of the core to be formed is estimated after considering the environmental information regarding the surrounding environment in which the core is formed, and thus it is possible to estimate the quality of the core precisely based on the change in the amount of water contained in the kneaded sand.

Second Embodiment

Next, the core quality estimation system 200 according to a second embodiment will be described. Since the hardware configuration of the core quality estimation system 200 according to the second embodiment is the same as that of the core quality estimation system 200 according to the first embodiment, the description thereof is omitted here. In addition, since a functional configuration also includes common parts, parts with differences will be described here.

Figure 6:
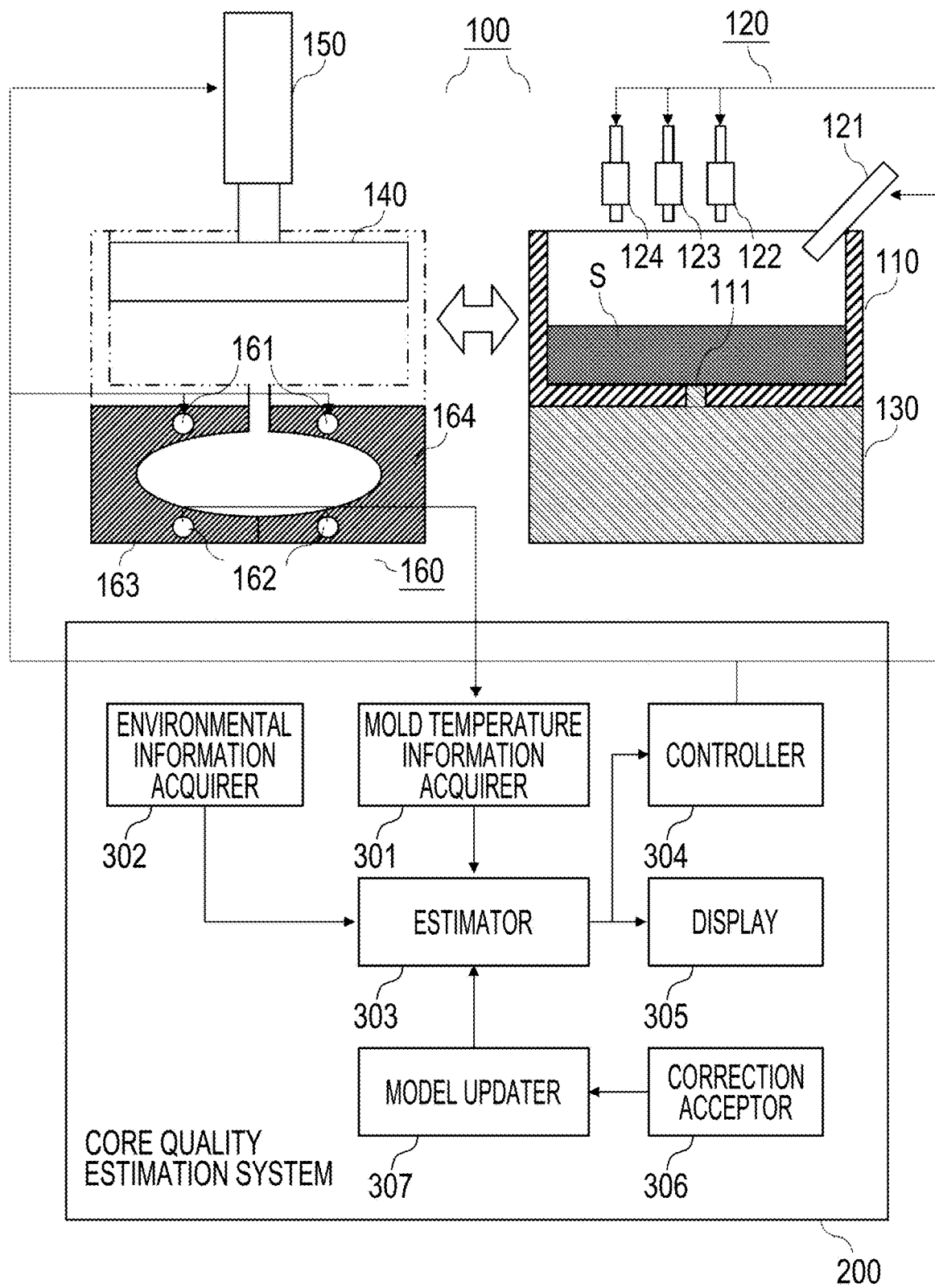
FIG. 6 is a view showing a functional configuration of a core quality estimation system according to a second embodiment.

FIG. 6 is a block diagram showing the functional configuration of the core quality estimation system 200 according to the present embodiment. As shown in FIG. 6, the core quality estimation system 200 includes the mold temperature information acquirer 301, the environmental information acquirer 302, the estimator 303, the controller 304, the display 305, a correction acceptor 306, and a model updater 307, as functional configurations.

The estimator 303 of the core quality estimation system 200 according to the second embodiment estimates the quality of the core to be formed by using a trained model that is trained by machine learning using supervised data with the mold temperature information acquired by the mold temperature information acquirer 301 and the environmental information acquired by the environmental information acquirer 302 as inputs and the quality information regarding the quality of the core as an output, based on the mold temperature information and the environmental information. Here, the trained model is a model that is trained in the core quality estimation system 200 or an external device such as an edge or a server (cloud) and stored in the estimator 303 in advance, the training performed by using supervised data with the mold temperature information and the environmental information as inputs and the quality information regarding the quality of the core as an output, and a specific learning method will be described in detail later.

The correction acceptor 306 accepts a correction to the estimation result of the quality of the core by the estimator 303. Specifically, when the quality of the core that has been actually formed is checked by another means instead of the estimation by the estimator 303, such as an operator or an inspection device inspecting the actually formed core, the correction by the other means is accepted when the estimation result by the estimator 303 and the check result by the other means are different. Here, even when the results match, the information that there is no correction may be accepted. Further, in addition to the above, the check by the other means may be performed by using the mold temperature information obtained from the temperature sensor 162 when the mold 160 is actually filled with the kneaded sand S.

When the correction acceptor 306 accepts the correction, the model updater 307 updates the trained model stored in the estimator 303 based on correction contents. Specifically, the trained model that has been already trained is re-trained by a learning method to be described later, using training data set containing contents after correction. With the configuration, it is possible to suitably train the trained model stored in the estimator 303, and to estimate the quality of the core more precisely.

Next, a machine learning device 400 according to the second embodiment will be described. Although detailed description of a hardware configuration of the machine learning device 400 is omitted here, the machine learning device 400 has computer resources of a general information processing device as in the core quality estimation system 200. Further, here, an example will be described in which each part of the machine learning device 400 is implemented by an information processing device independent of the core quality estimation system 200, each of the machine learning device 400 may be implemented as a configuration inside the core quality estimation system 200, and some or of the functions may be performed in an external device such as an edge or a server (cloud). Specifically, in a factory or the like where there are a large number of core forming devices 100, the core forming device 100 and the core quality estimation system 200 existing in each cell in the factory is connected to a free opensource ghost (FOG) server through a network, and the FOG server provided for each cell is connected to a cloud server through the network. In the configuration, the machine learning device 400 may be provided on the FOG server or the cloud server. By providing the machine learning device 400 on the server in this way, it is possible to collect and learn information from a plurality of core forming devices and the like through a network.

Figure 7:
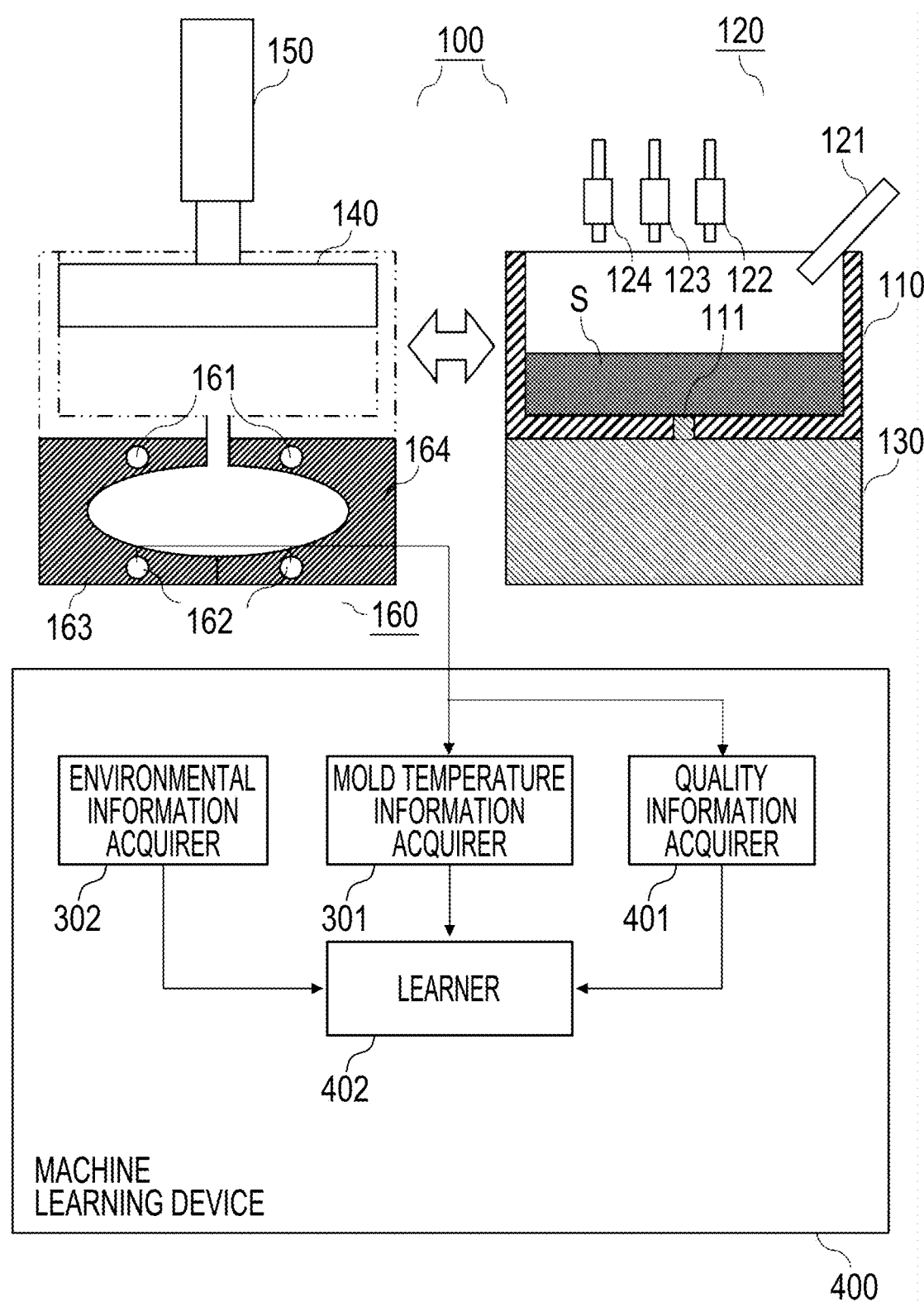
FIG. 7 is a view showing a functional configuration of a machine learning device according to the second embodiment.

Next, a functional configuration of the machine learning device 400 according to the present embodiment will be described. FIG. 7 is a block diagram showing a functional configuration of the machine learning device 400 according to the present embodiment.

The machine learning device 400 includes a mold temperature information acquirer 301, an environmental information acquirer 302, a quality information acquirer 401, and a learner 402. As described above, the mold temperature information acquirer 301 and the environmental information acquirer 302 acquire the mold temperature information of the mold 160 filled with the kneaded sand S and the environmental information regarding the surrounding environment in which the core is formed.

The quality information acquirer 401 acquires quality information regarding the quality of the formed core. Specifically, in association with the mold temperature information acquired by the mold temperature information acquirer 301 and the environmental information acquired by the environmental information acquirer 302, the quality information acquirer 401 acquires the quality information regarding the quality of the core formed under the conditions. Here, in the present embodiment, an example will be described in which the mold temperature information of the mold 160 at the time of filling with or heating of the kneaded sand S, which is measured when the core is actually formed, is used as the quality information; similarly, the behavior information measured at the time of filling with the kneaded sand S may be used as the quality information, and information on whether or not an actually formed core is a good quality product, which is obtained by the operator or the like who inspects the core and input an inspection result as inspection result information may be used as the quality information.

The learner 402 creates and stores supervised data with the mold temperature information acquired by the mold temperature information acquirer 301 and the environmental information acquired by the environmental information acquirer 302 as inputs and the quality information associated with the above-mentioned information as an output, and performs so-called supervised learning for learning the quality of the core to be formed based on the supervised data. In addition, supervised learning is to generate a trained model for estimating an output from an input through training by supervised data, that is, a training data set of a certain input and an output for the input, and in the embodiment of the disclosure, various methods used in the supervised learning can be used.

Here, taking a neural network as an example, a learning phase for learning the quality of the core to be formed by the machine learning device 400 and an operation phase of estimating the quality of the core to be formed by the core quality estimation system 200 by using the trained model that has been trained will be described.

First, in the learning phase, a training data set is created. For example, one training data set is created and stored by taking, as input values, mold temperature information for a plurality of places inside the mold 160, which are acquired by the mold temperature information acquirer 301, and temperature information, humidity information, and atmospheric pressure information for the surrounding environment, which are acquired by the environmental information acquirer 302, and taking, as an output value, the mold temperature information of the mold 160 at the time of filling the mold 160 with the kneaded sand S when the core is actually formed under the conditions. By preparing a number of data representing the relationship between the inputs and the output, a training data set used for machine learning is created.

Figure 8:
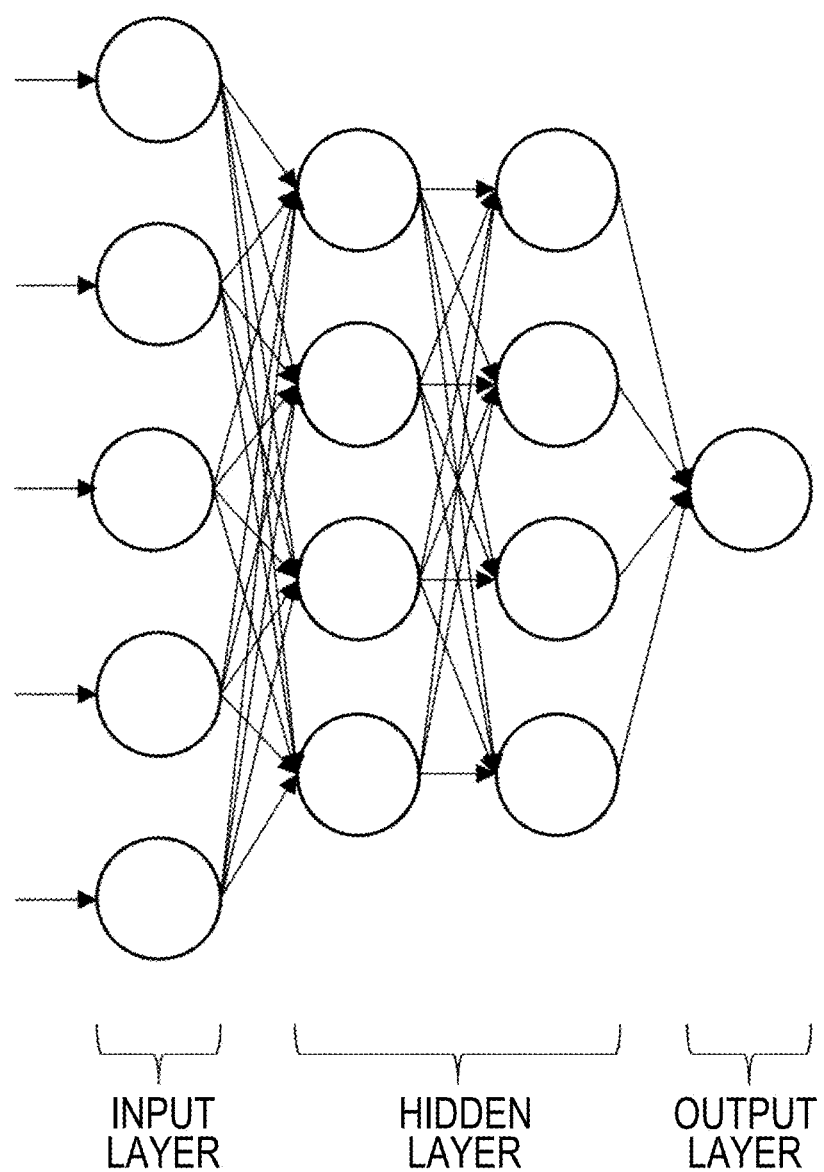
FIG. 8 is a view showing a neural network used for machine learning according to the second embodiment.

Next, a neural network used for learning will be described with reference to FIG. 8. FIG. 8 shows a "multi-input, one-output" hierarchical neural network. Here, for the sake of simplicity, a hidden layer is described as being made up of two layers, but in reality, it goes without saying that the hidden layer is more multi-layered, and the number of nodes in the input layer and the hidden layer can also be optionally changed with the training data set.

By using the above-mentioned training data set and inputting an input value for each node of the input layer of the neural network, the mold temperature information of the mold 160 at the time of filling the mold 160 with the kneaded sand S is output from the output layer as an estimated value. Then, learning is performed such that the estimated value matches the mold temperature information of the mold 160 at the time of filling the mold 160 with the kneaded sand S when the core is actually formed, which is prepared as the training data set. Specifically, learning is performed using backpropagation or the like until the error of the values converges to a predetermined setting error or less, and the weight or bias of the neural network (hereinafter collectively referred to as "weight") is learned. In this way, the neural network (trained model) is generated that outputs mold temperature information of the mold 160 at the time of filling the mold 160 with the kneaded sand S in response to the input of the mold temperature information acquired by the mold temperature information acquirer 301 and the environmental information acquired by the environmental information acquirer 302.

The neural network with the weight that has been learned in this way is output to the estimator 303 of the core quality estimation system 200, and the operation phase is executed.

In the operation phase, as shown in FIG. 8, input values of the mold temperature information acquired by the mold temperature information acquirer 301 and the environmental information acquired by the environmental information acquirer 302 are input to the input layer of the trained neural network, and the mold temperature information of the mold 160 at the time of filling the mold 160 with the kneaded sand S is output as an estimated value from the output layer. The estimator 303 compares the mold temperature information of the mold 160 output by the neural network with a predetermined specified range and estimates the quality of the core. Further, by the same method, it is possible to generate a neural network that outputs the behavior information at the time of filling with the kneaded sand S and a neural network that outputs information indicating whether or not the core is a good quality product. Further, in the present embodiment, an example has been described in which the mold temperature information and the environmental information are used as input values; in addition to the above, various forming conditions such as the raw material type of the kneaded sand S, the raw material ratio such as the amount of water, the kinematic viscosity of the kneaded sand S, and the ejection pressure can be used as input values.

Figure 9:
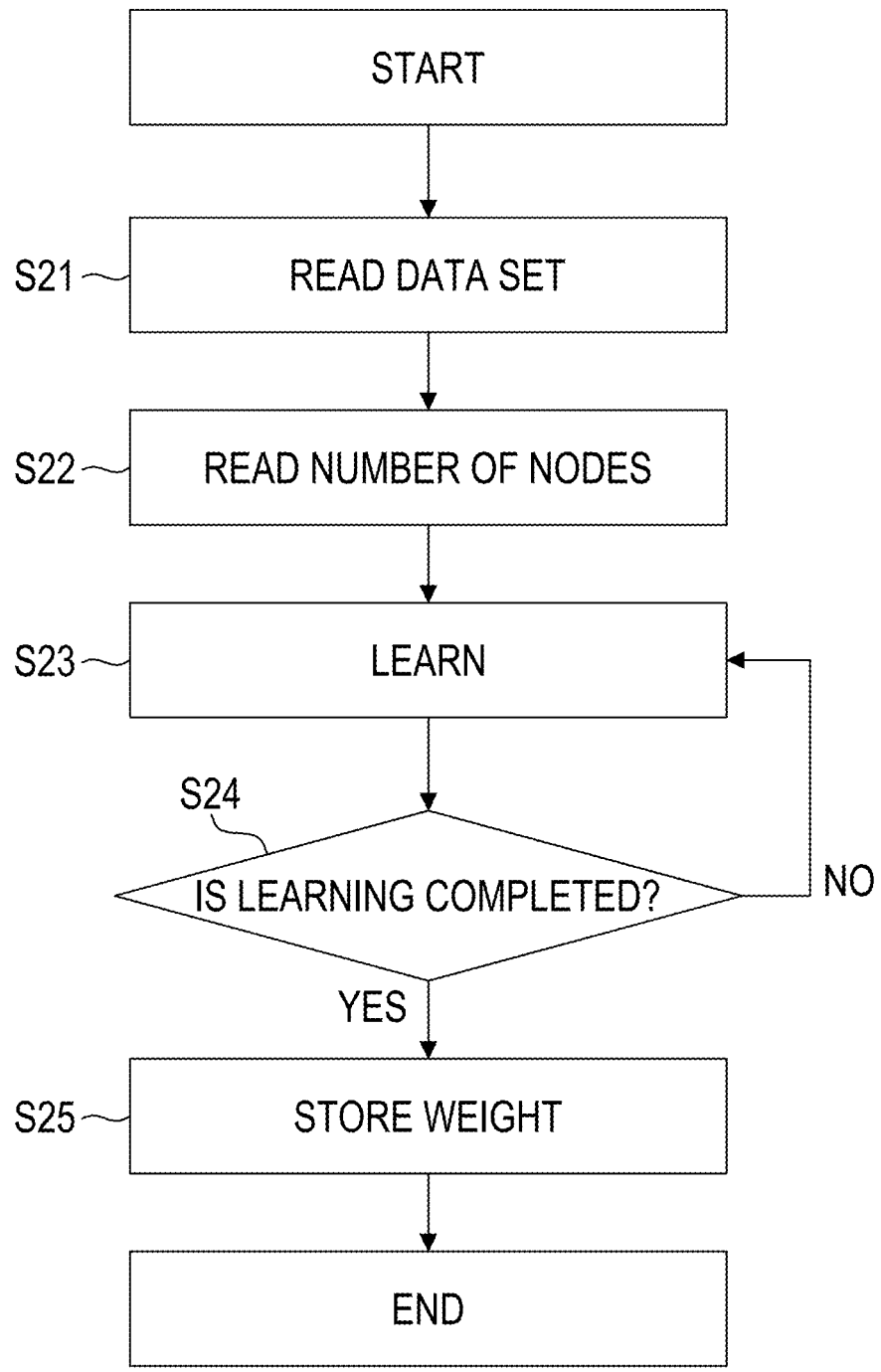
FIG. 9 is a flowchart showing a procedure of a learning process according to the second embodiment.

Next, a procedure of the learning phase in the machine learning device 400 according to the present embodiment, that is, a learning method will be described. FIG. 9 is a flowchart of a learning process according to the present embodiment. The procedure starts, for example, in a state where a predetermined amount or more of training data sets are accumulated in the machine learning device 400. Further, when a predetermined amount or more of training data sets is newly accumulated from the previous learning, the learning process may be executed and re-learning may be performed.

First, in step S21, the learner 402 reads each piece of data of the training data sets stored in the machine learning device 400.

Next, in step S22, the learner 402 reads the number of nodes of each of an input layer, a hidden layer, and an output layer of the neural network, and forms the neural network.

In step S23, the learner 402 learns a weight of the neural network by using the read training data set. Specifically, the learner 402 inputs an input value of the training data set to the input layer, and learns the weight of the neural network by using backpropagation such that an error between an output value output from the neural network and an output value of the training data set is reduced. Sequentially, when learning is performed for all the data, the process proceeds to step S24.

In step S24, the learner 402 determines whether or not the error between the output value from the neural network and the output value of the training data set has converged to a predetermined setting error or less, and when the determination is made that the error has converged to the setting error or less, the process proceeds to step S25, and the weight of the trained neural network is stored. On the other hand, when the determination is made that the error has not converged to the setting error or less, the learner 402 learns the weight again in step S23, and continues to learn until the error between the output value from the neural network and the output value of the training data set converges to the setting error or less.

Figure 10:
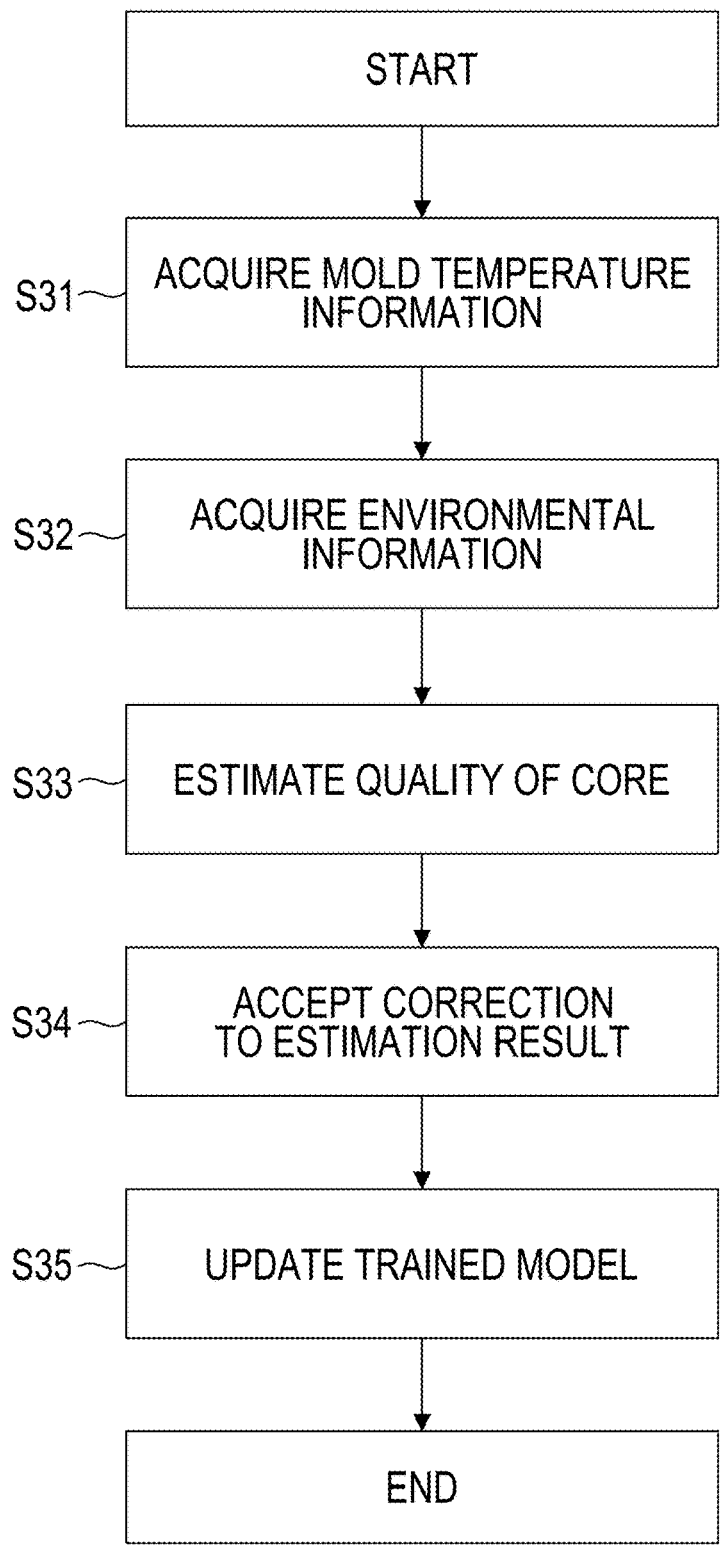
FIG. 10 is a flowchart of a core quality estimation process according to the second embodiment.

Next, a procedure of the operation phase in the core quality estimation system 200 according to the present embodiment, that is, a core quality estimation method will be described. FIG. 10 is a flowchart of a core quality estimation process according to the present embodiment, but since most of the flowchart is the same as those of the flowchart of the core quality estimation process according to the first embodiment, and here, parts with differences will be described. The procedure starts in a state where the above-mentioned learning process is completed and the trained model is stored in the estimator 303.

First, in steps S31 and S32, similarly, after the mold temperature information and the environmental information are acquired, and then, in step S33, the estimator 303 estimates the quality of the core to be formed by using the trained model for which the above-mentioned learning process has been completed, based on the mold temperature information and the environmental information. Here, as in the first embodiment, it is desirable that the estimation by the estimator 303 is performed by the time the filling of the mold 160 with the kneaded sand S is completed in the forming process of the core to be estimated, and it is more desirable that the estimation by the estimator 303 is performed until the kneading for the kneaded sand S in the kneading tank 110 is completed. When it is desired to estimate the quality of the core earlier than a predetermined timing of the core forming process in this way, the estimation can be performed by some actions, such as selecting a simple model structure for the trained model as described above, and reducing the information used as input.

Subsequently, in step S34, the correction acceptor 306 accepts a correction to the estimation result of the quality of the core by the estimator 303.

Next, in step S35, when the correction acceptor 306 accepts the correction, the trained model stored in the estimator 303 is updated based on contents after correction by the model updater 307, and the process ends. Although omitted in the procedure, as described in the procedure of the core quality estimation process according to the first embodiment, the controlling of the forming conditions by the controller 304 and the displaying of the estimation result of the quality of the core or the like by the display 305 may be added.

In the core quality estimation system according to the present embodiment, in particular, the estimator 303 estimates the quality of the core by using the trained model that is trained by machine learning using supervised data with the mold temperature information and the environmental information as inputs and the quality information regarding the quality of the core as an output, based on the mold temperature information and the environmental information, and accordingly, the quality of the core to be formed can be estimated by using the trained model that has been trained in advance in the relationship between the mold temperature information and the environmental information and the quality information for the core, and thus, the effect of estimating the quality of the core more precisely based on the change in the amount of water contained in the kneaded sand can be achieved.

Other Embodiments

In the first and second embodiments, the case where the core quality estimation system 200 and the machine learning device 400 are provided for each core forming device 100 has been described as an example; however, the core quality estimation system 200 and the machine learning device 400 may be configured to be shared among a plurality of core forming devices 100 to estimate and learn the quality of cores formed by the plurality of core forming devices 100. Further, in the first and second embodiments, the examples in which the estimator 303 estimates the quality of the core by using the behavior analysis of the kneaded sand S in the mold 160 using CAE and estimates the quality of the core using the trained model that has been trained by using supervised data; however, the estimation method is not limited to the above examples, and various methods such as estimation by a mathematical formula calculated in advance and multivariate analysis can be used.

It should be noted that the embodiments of the disclosure are not limited to the above embodiments, and can be variously implemented by appropriately making changes without departing from the spirit of the present disclosure.

What is claimed is:

1. A core quality estimation system that estimates quality of a core obtained by a process of moving a kneading tank containing kneaded sand to a mold, filling the mold with the kneaded sand from the kneading tank, and shaping the kneaded sand by heating, the core quality estimation system comprising a computer that executes operations of:

acquiring mold temperature information of the mold from a temperature sensor provided in the mold;

acquiring environmental information regarding a surrounding environment in which the core is formed;

estimating the quality of the core based on (i) the mold temperature information of the mold during filling of the mold with the kneaded sand or during heating of the kneaded sand in the mold, (ii) the environmental information, and (iii) a behavior information of the kneaded sand during the filling of the mold with the kneaded sand, obtained by using a behavior analysis of the kneaded sand inside the mold using computer aided engineering (CAE); and controlling an amount of water added, an amount of core sand added, an amount of surfactant added, and a kneading time included in molding conditions during the kneading of the kneaded sand in the kneading tank, and controlling the mold temperature included in the molding conditions when filling the kneaded sand into the mold, based on results of the estimating using the CAE.

2. The core quality estimation system according to claim 1, wherein the environmental information includes at least one of humidity information and atmospheric pressure information for the surrounding environment.

3. The core quality estimation system according to claim 1, wherein the computer acquires the environmental information based on position information for forming the core.

4. The core quality estimation system according to claim 1, wherein the computer estimates the quality of the core to be formed by the kneaded sand before the filling of the mold with the kneaded sand is completed.

5. The core quality estimation system according to claim 4, wherein the computer estimates the quality of the core to be formed by the kneaded sand before kneading of the kneaded sand in the kneading tank is completed.

\* \* \* \* \*